US006431242B1

(12) United States Patent
Irons

(10) Patent No.: US 6,431,242 B1
(45) Date of Patent: Aug. 13, 2002

(54) SELF-ADHESIVE ITEM DISPENSER

(76) Inventor: Michael Irons, 4016 Jefferson St., Columbia Heights, MN (US) 55421

(*) Notice: Subject to any disclaimer, the term of this patent is extended or adjusted under 35 U.S.C. 154(b) by 0 days.

(21) Appl. No.: 09/577,328

(22) Filed: May 24, 2000

(51) Int. Cl.[7] ........................ B32B 35/00
(52) U.S. Cl. ........................ 156/542; 156/577; 156/579
(58) Field of Search ........................ 156/540, 542, 156/574, 577, 578, 579

(56) References Cited

U.S. PATENT DOCUMENTS

| | | | |
|---|---|---|---|
| 4,570,868 | A | 2/1986 | Wiggs et al. |
| 4,624,733 | A | 11/1986 | Hamisch, Jr. |
| 4,954,210 | A | 9/1990 | Desmond |
| 5,806,713 | A | 9/1998 | Dudley et al. |
| 5,806,714 | A | 9/1998 | Geiger |
| 5,851,347 | A | 12/1998 | Rodriguez |
| 5,863,384 | A | 1/1999 | Reddy |

*Primary Examiner*—Richard Crispino
*Assistant Examiner*—Sing P. Chan
(74) *Attorney, Agent, or Firm*—Patterson, Thuente, Skaar & Christensen, P.A.

(57) ABSTRACT

A self-adhesive item dispenser includes a base portion, a lid portion and a roller. The base portion generally includes an item cavity for storing a roll of self-adhesive items and a roller cavity, which incorporates a number of extending ribs. The roller is positionable within the roller cavity and interfaces with the ribs of the base portion to pull a release liner from the self-adhesive items and expel the release liner through the base portion. The lid portion is releasably closeable over the base portion and is connected thereto via a living hinge or a mechanical hinge.

20 Claims, 13 Drawing Sheets

FIG. 4
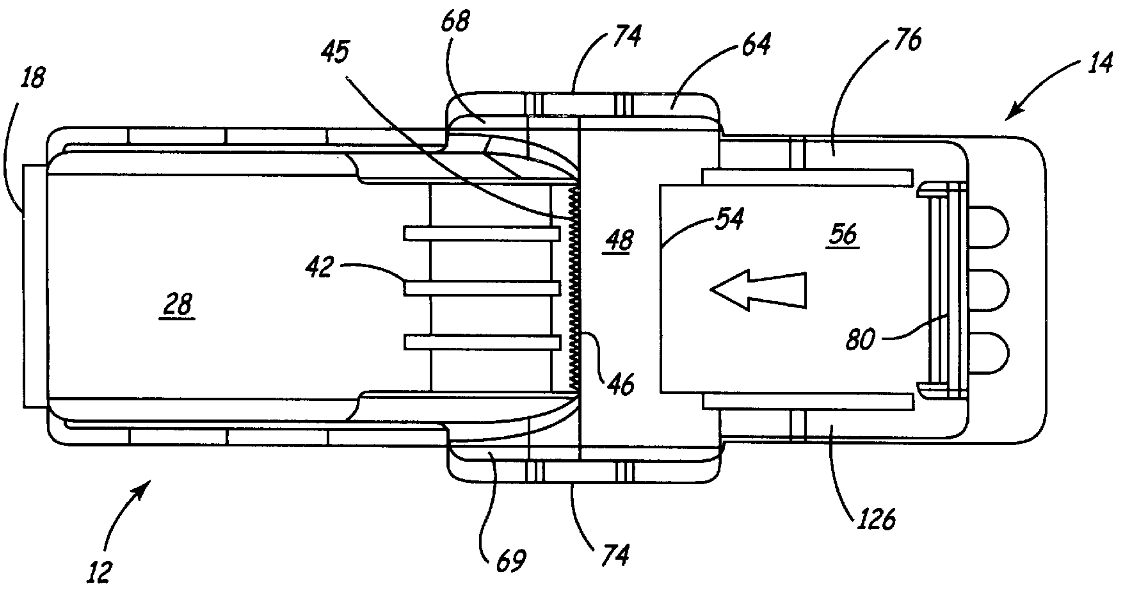
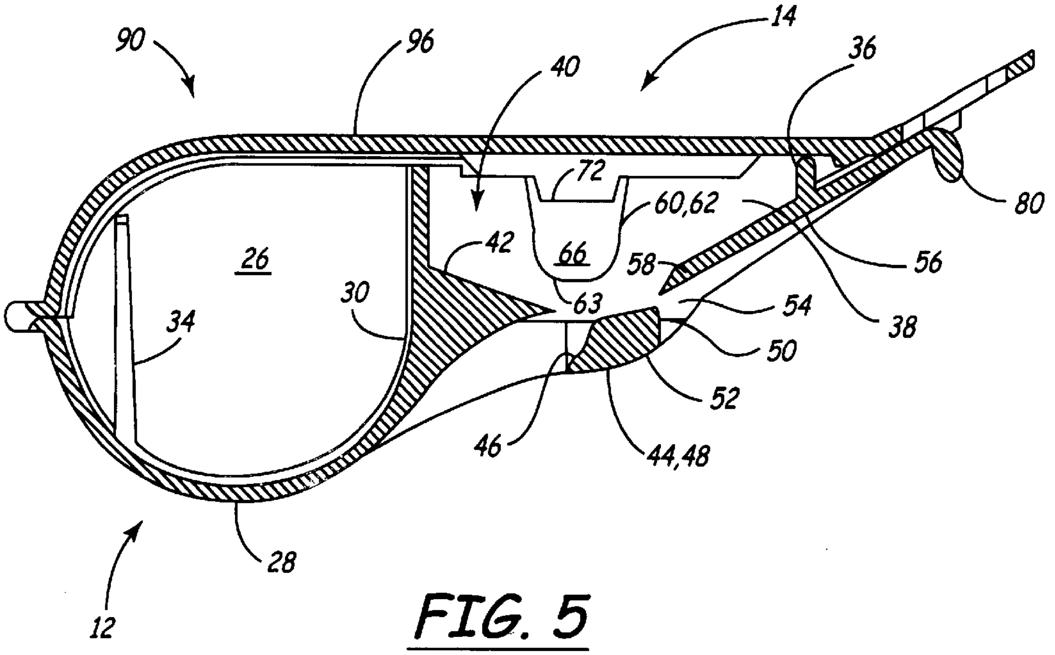
FIG. 5

FIG. 6
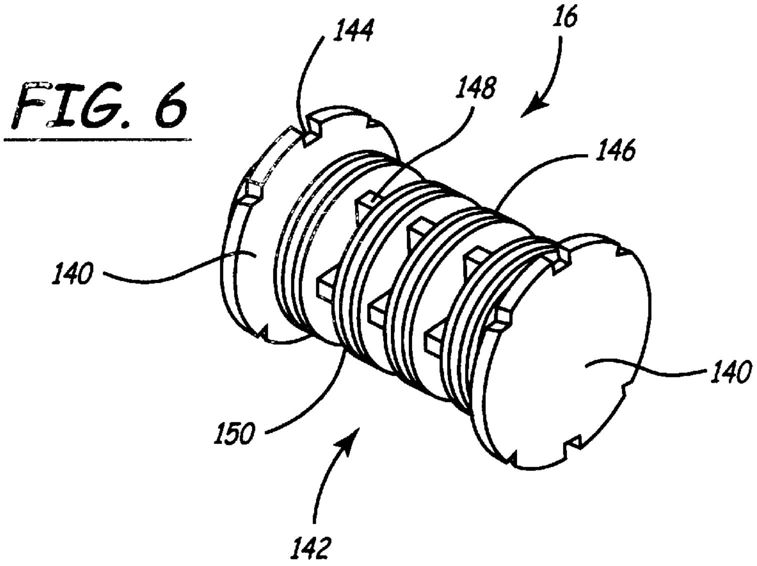
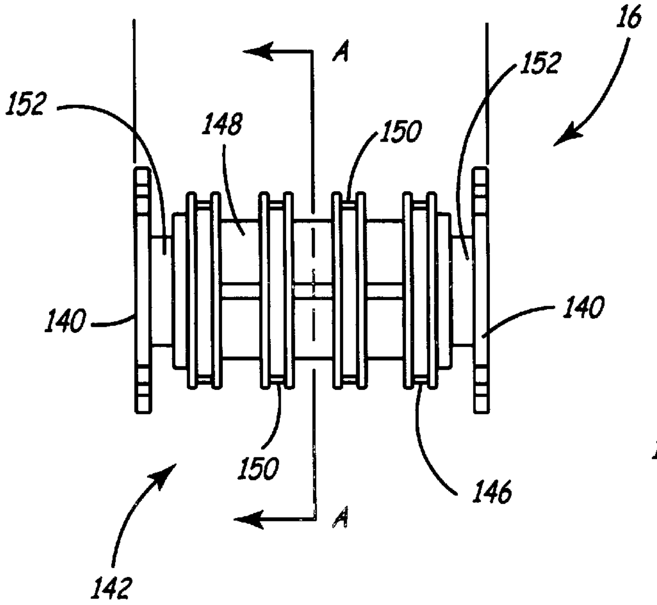
FIG. 7
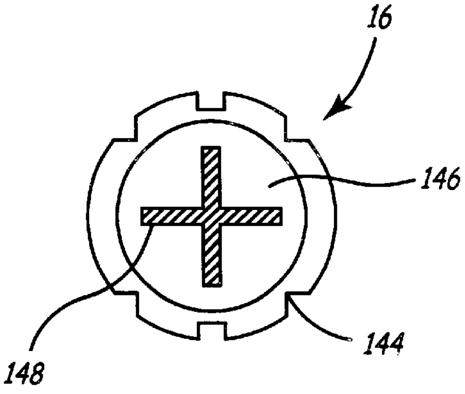
FIG. 8

FIG. 11
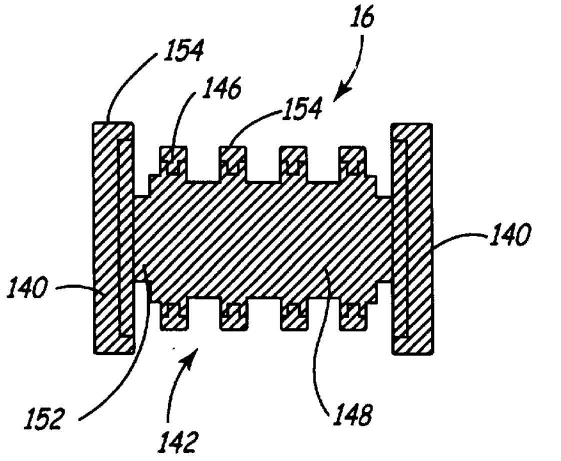
SECTION A-A
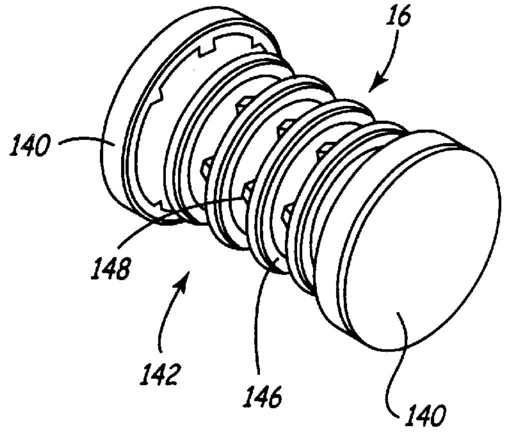
FIG. 9
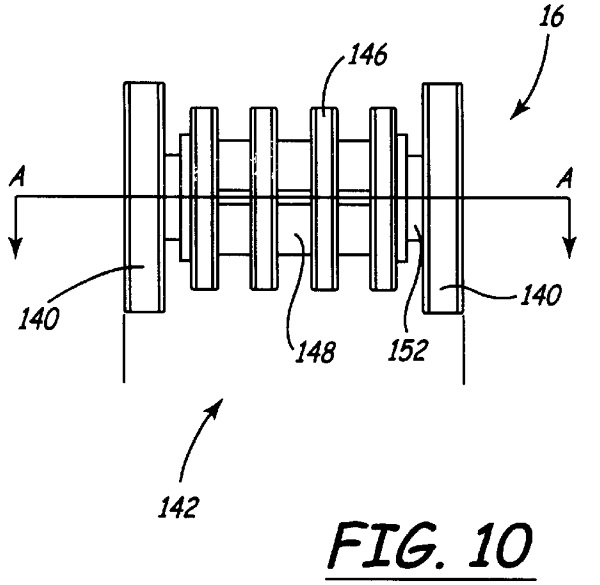
FIG. 10

FIG. 14
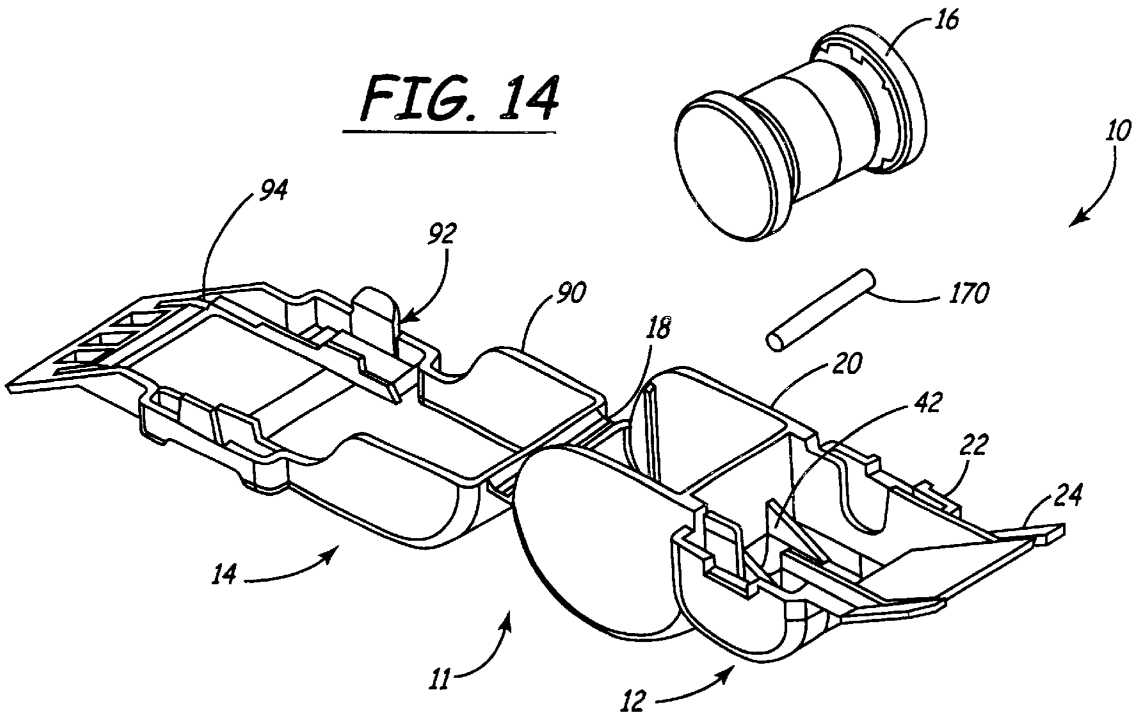
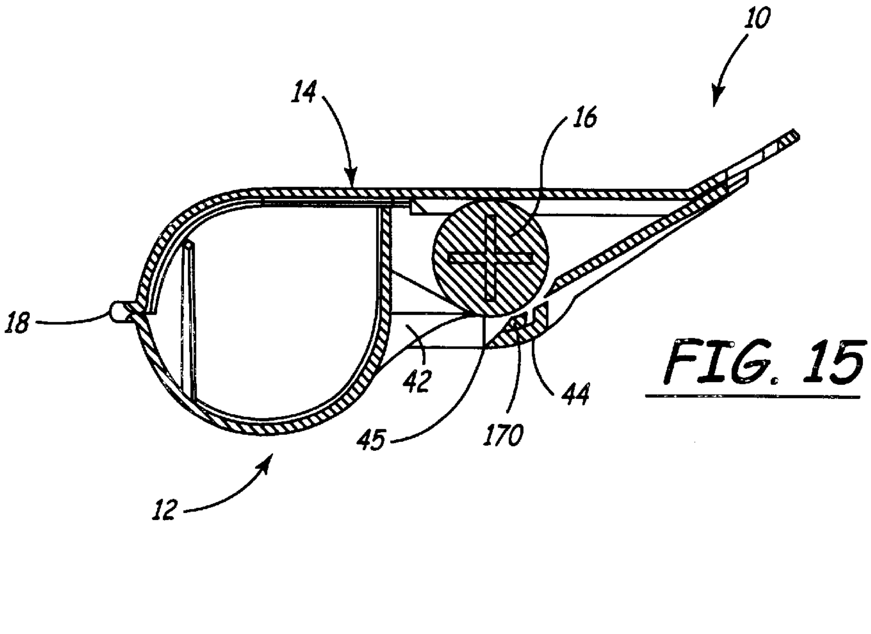
FIG. 15

SELF-ADHESIVE ITEM DISPENSER

FIELD OF THE INVENTION

The present invention relates to dispensers capable of dispensing items that are maintained in a roll format and, more particularly, to a dispenser capable of dispensing items that are maintained in a roll format, wherein the items include a top, self-adhesive layer and a lower release layer.

BACKGROUND OF THE INVENTION

The United States Post Office has recently provided customers with the option of self-adhesive stamps. For convenience sake, a customer has the further option of buying the self-adhesive stamps in a 100 stamp roll configuration. Without any type of storage and/or dispensing device, the roll configuration is somewhat awkward tending to unwind and/or flop around undesirably. Further, without any type of dispensing device, the user is required to peal away the release liner beneath the self-adhesive stamp. However, because the release liner is the same size as the stamp, i.e., no edge extending beyond the length or width of the stamp, the user must attempt to slide a fingernail or other lifting means beneath the stamp to remove it from the release liner. While removing the stamp from the release liner is not overly burdensome, it can become frustrating and tedious.

As such, various types of stamp dispensers have been developed to aid in the storage and removal of self-adhesive stamps from the release liner. For example, U.S. Pat. No. 5,863,384 describes a self-adhesive postage stamp dispenser and applicator that includes a housing with an insertable cartridge. The insertable cartridge incorporates a ratchet wheel that is attached to a strap for grabbing the release liner. Once the release liner is grabbed, it is drawn inside the housing and wrapped about a spool in the cartridge. The numerous components, e.g., housing, cartridge, ratchet wheel, strap and spool, add complexity and cost to the design. Further, because the release liner is spooled within the housing and cartridge, the possibility of a jam, e.g., the bunching of the release liner within the cartridge, exists.

U.S. Pat. No. 5,851,347 describes a stamp affixer apparatus and method. The affixer in this case includes a rotatable housing as well as two gear assemblies and a drive roller. And, as with the earlier described patent, the release liner is spooled within the housing. Once again, the numerous components add to the complexity and cost of the design while the inner spooling of the release liner presents the possibility of a jam.

Thus, there is a need for a self-adhesive stamp dispenser that has a minimal number of distinct components to reduce the cost and complexity of manufacture of the dispenser. Further, there is a need for a dispenser that eliminates the interior spooling of the release liner to reduce the possibility of jams, and thus, the resetting of the dispenser for operation.

SUMMARY OF THE INVENTION

The needs described above are in large measure met by a self-adhesive stamp dispenser of the present invention. The dispenser has only two components, a housing and a roller, thereby reducing the cost and complexity of manufacture and, as well, eliminates the need for interior spooling of the release liner. More specifically, the dispenser includes a housing, having a base portion and a lid portion, and a roller incorporating a tacky surface. The base portion generally includes a stamp cavity for storing the roll of self-adhesive stamps and a roller cavity, which incorporates a number of extending ribs. The roller is positionable within the roller cavity and interfaces with the ribs of the base portion to pull the release liner and expel the release liner through the base portion. The lid portion is releasably closeable over the base portion.

Upon closing the lid portion over the base portion, at least part of the roller extends up through the lid portion thereby presenting itself for manual propulsion. As indicated above, the roller is preferably provided with a tacky surface to aid in propulsion and in the pulling and expelling of the release liner. Both the lid portion and the base portion are preferably provided with a resistance feature. This resistance feature is generally in the form of an extending wall or rib and helps to separate the self-adhesive items from each other upon being dispensed from the dispenser. Further, both the lid portion and the base portion are preferably provided with a centering feature to aid in the centering of the self-adhesive stamps within and about the dispenser. Lid portion and base portion may be unitary in nature, i.e., connected by a living hinge, allowing them to be manufactured as a single mold. Alternatively, the lid portion and the base portion may be manufactured as distinct components and connected via a mechanical hinge.

BRIEF DESCRIPTION OF THE DRAWINGS

FIG. 4 is a cross-sectional view of the base portion and lid portion in a closed, or operational, configuration.

FIG. 5 is a bottom view of the base portion and lid portion in a closed, or operational, configuration.

FIG. 6 is a perspective view of the roller prior to overmolding.

FIG. 7 is a side view of the roller of FIG. 6.

FIG. 8 is a cross-sectional view of the roller taken along line A—A of FIG. 7.

FIG. 9 is a perspective view of the roller after overmolding has occurred.

FIG. 10 is a side view of the roller of FIG. 9.

FIG. 11 is a cross-sectional view of the roller taken along line A—A of FIG. 10.

FIG. 14 provides a perspective assembly view of an alternative embodiment of the self-adhesive item dispenser of the present invention wherein the dispenser incorporates a roller pin.

FIG. 15 is a cross-sectional view of the self-adhesive item dispenser embodiment of FIG. 14.

DETAILED DESCRIPTION OF THE PREFERRED EMBODIMENTS

I. Self-Adhesive Item Dispenser—Components

A self-adhesive item dispenser of the present invention is preferably used with a one-hundred roll configuration of self-adhesive postage stamps, of course, other types of self-adhesive items may be used with the dispenser without departing from the spirit or scope of the invention. The dispenser is designed to pull the release layer of the postage stamps forward allowing a stamp to dispense and thereby be applied to a desired surface through use of an applicator lip edge on the dispenser. The dispenser is designed to be durable for long-lasting use.

Figure 1:
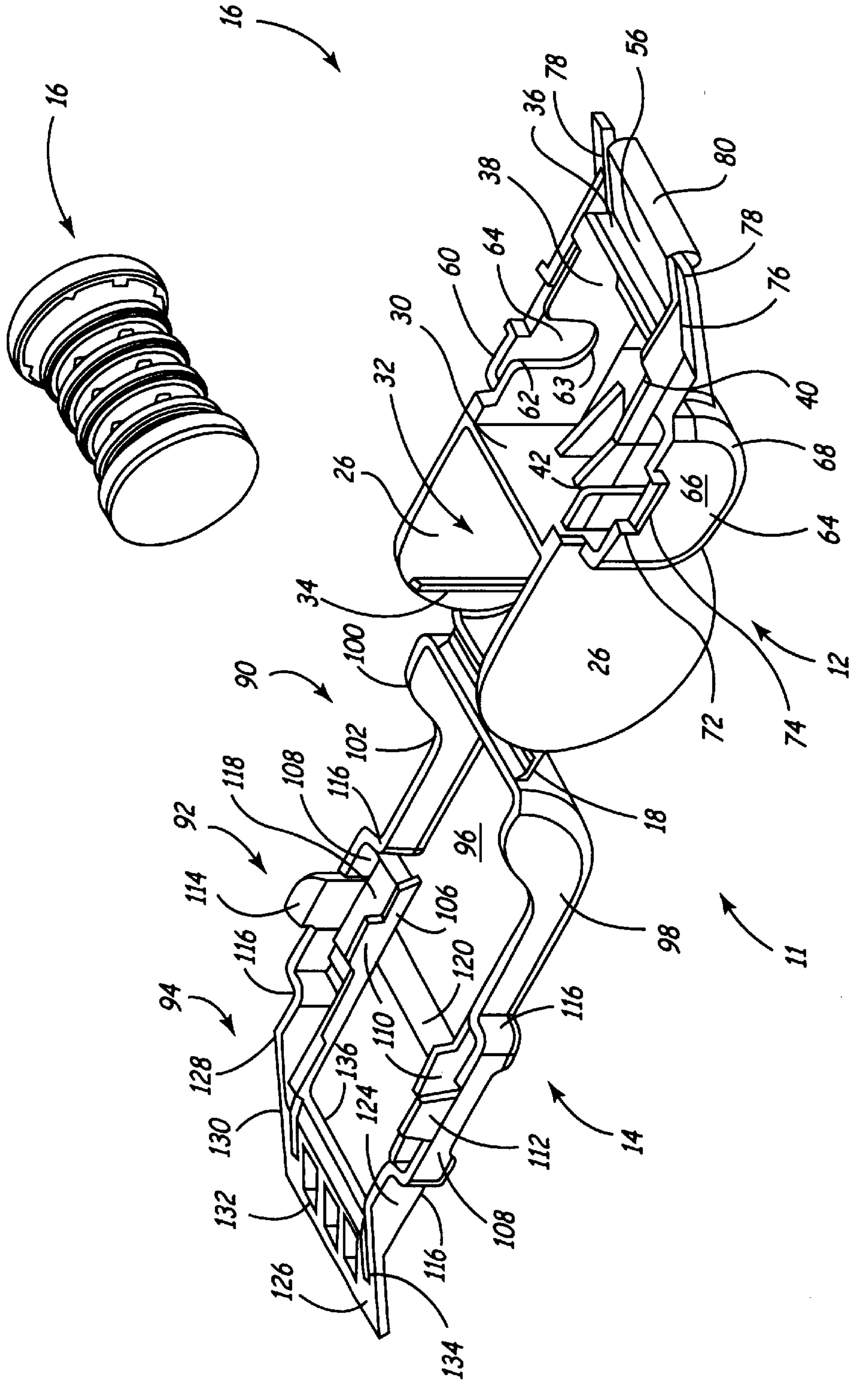
FIG. 1 is a perspective assembly view of the self-adhesive item dispenser of the present invention showing a base portion, a lid portion, and a roller.
Figure 2:
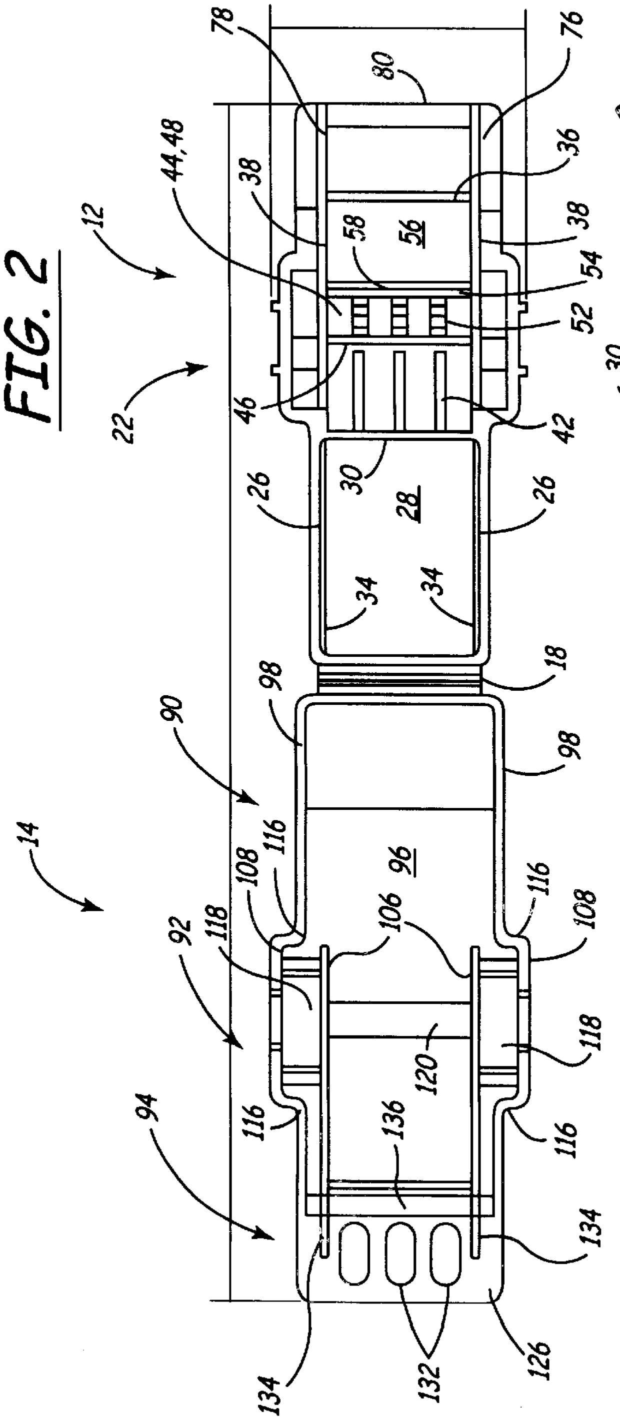
FIG. 2 is a top view of the base portion and lid portion in an open, or molded, configuration.
Figure 3:
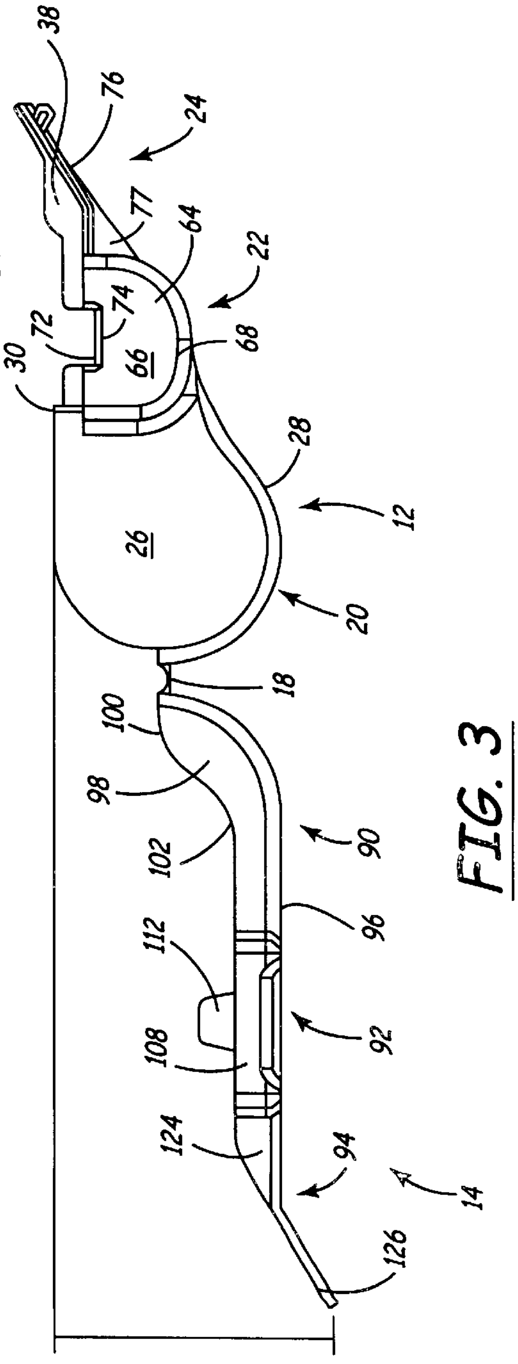
FIG. 3 is a side view of the base portion and lid portion, in an open, or molded, configuration.

Referring to FIG. 1, self-adhesive item dispenser 10 generally includes a housing 11, comprising a base portion 12 and a lid portion 14, and a roller 16. Base portion 12 and lid portion 14 are depicted in further detail with reference to FIGS. 1–5. As shown, base portion 12 and lid portion 14 are preferably molded as an integral unit from ABS plastic, polypropylene or other suitable materials, and are connected to each other via a living hinge 18.

Base portion 12 generally includes a stamp holding portion 20, an intermediate roller holding portion 22, and an upper dispensing portion 24. Stamp holding portion 20 is defined by two substantially vertical side walls 26 that are joined together by a convex lower wall 28 that extends generally from living hinge 18 to an intermediate, interior wall 30. Intermediate interior wall 30 extends substantially vertically upward from lower wall 28, joins side walls 26 thereby creating a stamp holding cavity 32, and separates stamp holding portion 20 from intermediate roller portion 22. The interior of each of side walls 26 is provided with an elongate rib 34 that protrudes slightly into cavity 32.

Intermediate roller holding portion 22 of base portion 12 utilizes intermediate interior wall 30, upper wall 36 and a pair of side walls 38 to define a roller cavity 40. Extending from intermediate interior wall 30 into roller cavity 40 are three, triangularly-shaped tines 42, the underside of each tine 42 preferably incorporates a curved configuration. Tines 42 stop just short of a cross-bar 44 that extends between the lower edges of side walls 38, whereby a gap 45 is left between tines 42 and cross-bar 44. Cross-bar 44 includes an angled, serrated lip edge 46 as well as an intermediate portion 48 and a substantially vertical edge 50 that define a space to support three ribs 52. Across a gap 54 from cross-bar 44 is positioned a plate 56 that joins the lower edges of side walls 38 and extends underneath upper wall 36 into upper dispensing portion 24. Plate 56 includes an angled lip portion 58 at gap 54.

Side walls 38 of intermediate holding portion 22 include an elongate notch 60 that is defined by substantially vertical side walls 62 and a convex lower wall 63. A trough 64 is defined to the exterior of each of side walls 38 proximate notch 60. Each trough 64 incorporates a substantially vertical side wall 66 that is joined to the exterior of side walls 38 via convex wall 68. Each side wall 66 includes an upper edge 70 that includes a shallow notch 72 with an outward-extending lock edge 74. A sealing edge 76 extends from each trough 64 along side walls 38 into upper dispensing portion 24. A pair of guide walls 77 are positioned beneath sealing edge 76 to the exterior of plate 56

Upper dispensing portion 24 is generally that portion of base portion 12 that extends beyond upper wall 36. As such, upper dispensing portion 24 is generally defined by upper wall 36, the portion of plate 56 extending beyond upper wall 36, the portion of side walls 38 extending beyond upper wall 36, and the portion of sealing edge 76 extending beyond upper wall 36, as well as inner guide walls 78 and a dispensing lip edge 80, which is preferably radiused, e.g., 200 thousandths radius, at the upper edge of plate 56.

Lid portion 14 of dispenser 10, like base portion 12, may generally be defined as comprising three integral portions, i.e., a stamp cap portion 90, a roller cap portion 92, and a dispensing cap portion 94. Stamp cap portion 90, roller cap portion 92 and dispensing cap portion 94 are joined together by a common central cap portion 96. Central cap portion 96 extends substantially perpendicularly upward from living hinge 18 then curving to a substantially horizontal orientation as shown.

Stamp cap portion 90 includes the rear portion of central cap portion 96 and further includes a pair of substantially planar side walls 98. Side walls 98 are each defined by a substantially horizontal lower edge 100 and a curvedly recessed forward edge 102.

Roller cap portion 92 includes the intermediate portion of central cap portion 96 and further includes a pair of interior side walls 106 and a pair of exterior side walls 108. Interior side walls 106 incorporate a shallow tab 110, while exterior side walls 108 incorporate an elongate locking tab 112 with angled lip edge 114. Interior side walls 106 are separated from exterior side walls 108 by spacers 116 such that a gap 118 is formed intermediate interior side walls 106 and exterior side walls 108. A hollow 120, e.g., rounded recess, is present at the underside of the intermediate portion of central cap portion 96 and is centrally located between interior side walls 106.

Dispensing cap portion 94 includes the forward portion of central cap portion 96 and further includes a pair of side walls 124 and a dispensing lip portion 126. Side walls 124 extend from the forward-most spacers 116 to dispensing lip portion 126 and incorporate a substantially horizontal lower edge 128 and an angularly recessed forward edge 130. Dispensing lip portion 126 includes a plurality, e.g., three, slots 132 to allow for viewing of the items being dispensed. The underside of dispensing cap portion 94 is defined by a pair of grooves 134 that extend along central cap portion 96, from interior side walls 106, into dispensing lip portion 126, as well as by a ridge 136 that protrudes from central cap portion 96 and is positioned intermediate grooves 134.

Roller 16 is depicted in detail in FIGS. 6–11, wherein FIGS. 6–8 depict roller 16 prior to over-molding, and FIGS. 9–11 depict roller 16 after over-molding. Referring to FIGS. 6–8, roller 16 is defined by a pair of end wheels 140 and a central shaft portion 142. End wheels 140 are preferably provided with a toothed edge 144 in preparation for over-molding. Central shaft portion 142 is provided with four central rollers 146 each of which is separated from the other by a spacer 148 having a cross-hatch configuration having a lesser diameter than central rollers 146. Each central roller 146 incorporates a notch or gap 150 in preparation of over-molding. Further, a pair of spacers 152, of significantly reduced diameter, separates central shaft 142 from end wheels 140. Roller 16, as depicted in FIGS. 6–8, is preferably molded as an integral unit from polypropylene or other suitable material.

Referring to FIGS. 9–11, roller 16 as depicted in FIGS. 6–8 has now been completely over-molded with a layer 154 of thermoplastic elastomer that preferably has a durometer in the 40's, e.g., 40±5%, and provides roller 16 with a tacky surface. As shown, toothed edge 144 and gap 150 have been filled in by elastomer layer 154 and a tacky surface is now present.

II. Self-Adhesive Item Dispenser—Assembly

Figure 12:
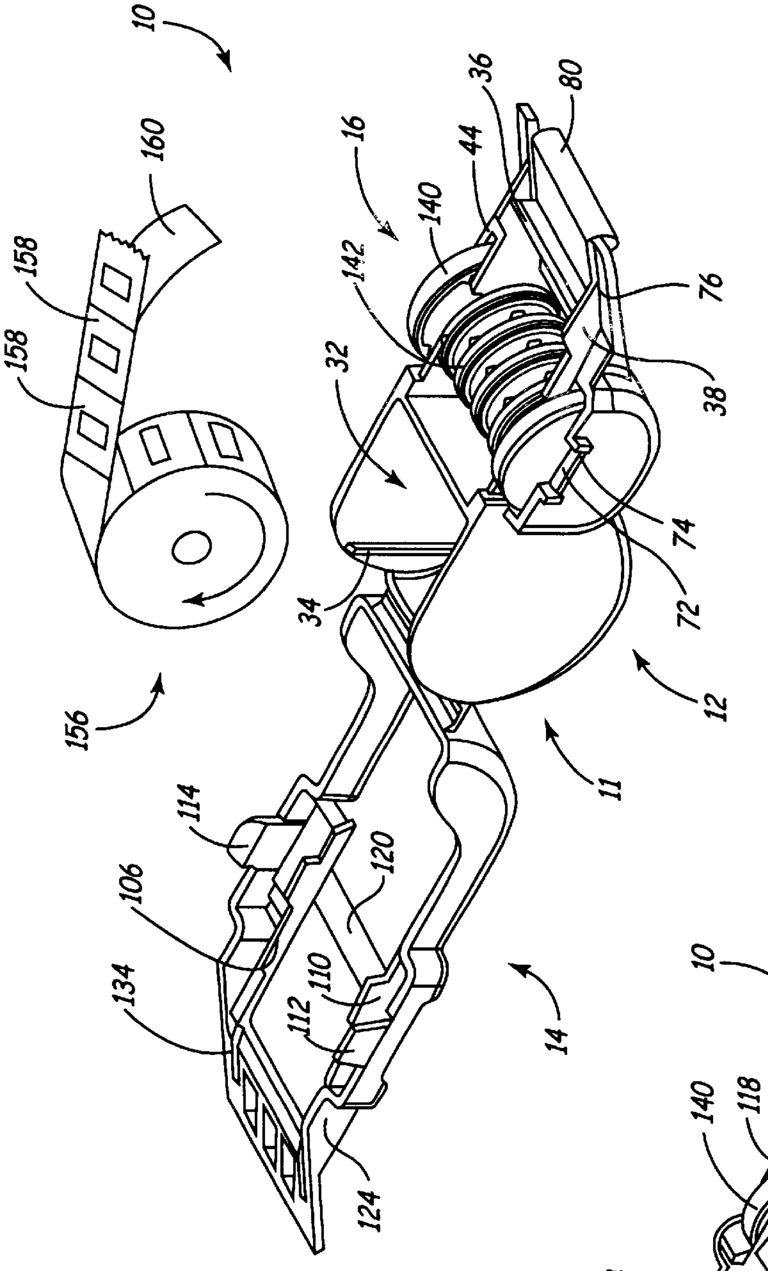
FIG. 12 is a perspective view of the dispenser with the roller inserted within the base portion wherein the dispenser is in an open configuration.
Figure 13:
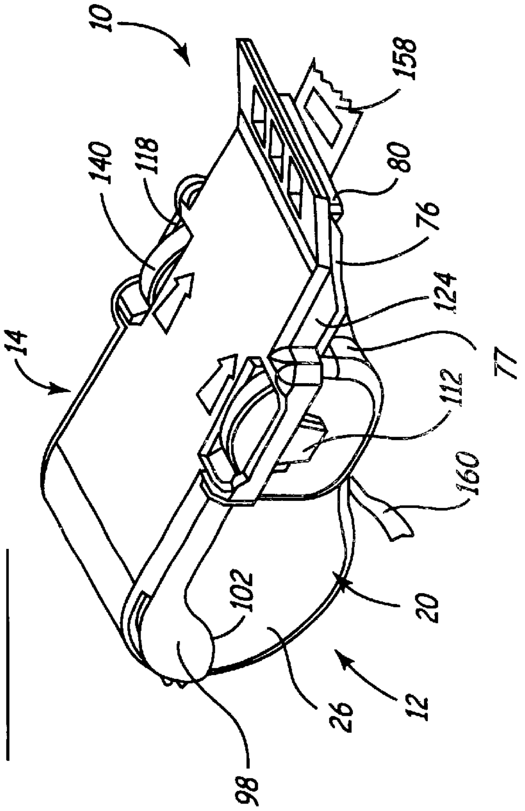
FIG. 13 is a perspective view of the dispenser with the lid portion positioned over the roller within the base portion, wherein the dispenser is in a closed configuration.

The assembly of self-adhesive item dispenser 10 is depicted in FIGS. 1, 12, and 13. To begin assembly, base portion 12 and lid portion 14 are laid out in their open or molded orientation, as depicted in FIGS. 1 and 12. Over-molded roller 16 is then positioned within roller cavity 40. When positioned within roller cavity 40, end wheels 140 of over-molded roller 16 are positioned within troughs 44 while spacers 152 are inserted within and supported by elongate notch 60 thereby allowing roller 16 to rotate freely, i.e., without contacting any other component of dispenser 10. Central rollers 146 are unobstructed during rotation as tines 42 and ribs 52 have been designed to be in substantial alignment with spacers 148 of central shaft 142.

Next, a 100-roll 156 of self-adhesive stamps is placed within stamp holding cavity 32 so as to unwind in a clock-wise direction. Elongate rib 34 within stamp holding cavity 32 operates to center roll 156 within stamp holding cavity 32. Two to three stamps 158 are then preferably removed from a release liner 160 so that release liner 160 may be pulled forward over over-molded roller 16. Release liner 160 is further pulled forward over the top of upper wall 36 and lip edge 80. Release liner 160 is then pulled to the underside of base portion 12 where it is inserted through gap 54 and exited out gap 45 such that release liner 160 runs over support ribs 52 (see FIGS. 4 and 5).

As release liner 160 is placed in contact with ribs 52, central rollers 146 of roller 16 are also engaged as ribs 52 force release liner to maintain a lifted position over cross-bar 44. The tackiness of over-molded roller 16 enables central rollers 146 to grab release liner 160 against ribs 52 and, as such, a clock-wise propelling motion of end wheels 140 causes release liner 160 to be propelled out gap 45. Serrated lip edge 46 on cross-bar 44 at gap 45 allows any excess release liner 160 to be torn away as desired.

With roll 156 and release liner 160 appropriately positioned within base portion 12, lid portion 14 is raised up from its open orientation (flexing a living hinge 18), placed down atop base portion 12, and locked in position to complete a closed orientation of dispenser 10. In the closed orientation, side walls 98 of stamp cap portion 90 straddle side walls 26 of stamp holding portion 20. The curvedly recessed configuration side walls 98 allow a user to grasp side walls 26 of base portion 12 proximate forward edge 102 without feeling the awkward interference of side walls 98.

Further, in a closed orientation, a top portion of each of end wheels 140 extends up through gap 118. Shallow tab 110 is inserted within elongate notch 60 whereby shallow tab 110 is positioned over spacer 152 of previously inserted over-molded roller 16 helping to maintain roller 16 in an operable position. Locking tab 112 extends down over shallow notch 72 whereby lip edge 114 engages lock edge 74 to hold lid portion 14 tight to base portion 12. Additionally, side walls 124 of dispensing cap portion 94 straddle side walls 38 and, as well, rest atop sealing edge 76. A base portion of dispensing lip portion 126 also rests atop sealing edge 76 while the remaining portion extends beyond sealing edge 76. An upper portion of side walls 38 engages groove 134. Thus, interior side walls 106 of roller cap portion 92 along with side walls 38 of intermediate roller holding portion 22 and grooves 134 of dispensing cap portion 94, operate to center the unrolling stamps 158 and release liner 160 as they move through dispenser 10. Guide walls 77 operate to center release liner 160 as it is fed into gap 54.

Additionally, with respect to the movement of stamps 158 and release liner 160 through dispenser, hollow 120 allows stamps 158 and release liner 160 to traverse through dispenser 10 without touching over-molded roller 16. In other words, over-molded roller 16 is not used to push stamps 158 out by pushing release liner 160 rather over-molded roller 16 is used only to pull release liner 160 across cross-bar 44 whereby release liner 160 is forced out/expelled through gap 45. The curved underside of tines 42 keep release liner 160 traveling outward through gap 45 rather than bunching up within roller cavity 40. Pushing of stamps 158 and release liner 160 with over-molded roller 16 would cause a large loop of stamps 158/release liner 160 to form thereby hindering operation of dispenser 10.

Further, upper wall 36 of upper dispensing portion 24 keeps stamps 158 and release liner 160 lifted upward preventing bunching within upper dispensing portion 24 while ridge 136 of dispensing cap portion 94 directs stamps 158 and release liner 160 downward, which also helps to prevent bunching within upper dispensing portion 24. The combination of upper wall 36 and ridge 136 also creates a resistance or tension against stamps 158, and release liner 160, so that they may easily be dispensed and separated from the following stamp 158.

The opening and restocking of dispenser 10 may be achieved simply by extending one or both of locking tabs 112 outward to release lid portion 14 from base portion 12.

III. Self-Adhesive Item Dispenser—Use

Self-adhesive item dispenser 10, once assembled as described above, may now be used to dispense and to apply self-adhesive stamps 158. To dispense one stamp 150, one or both of end wheels 140 is propelled forward, i.e., in a clock-wise motion, whereby over-molded roller 16 grabs release liner 160. Upon being grabbed by over-molded roller 16, release liner 160 is pulled downward and away from stamp 158 such that the free edge of stamp 158 is presented, i.e., extending over dispensing lip edge 80 and preferably just past the front edge of dispensing lip portion 126. The free edge of stamp 158 may then be placed at a desired position on an envelope. The rear portion of dispenser 10 is lifted upward causing dispensing lip portion 126 to press downward onto stamp 158 thereby affixing stamp 158 in position. Drawing dispenser 10 back while still pressing downward with dispensing lip portion 126 on stamp 158, with the aid of the resistance caused by upper wall 36 and ridge 136, causes stamp 158 to separate from the following stamp 158.

With one stamp 158 dispensed, the user is able to see, via slots 132, that the following stamp 158 is positioned directly under dispensing lip portion 126 and may now propel one or more of wheel ends 140 forward such that the free edge of stamp 158 is presented in the desired fashion, i.e., extending over dispensing lip edge 80 and preferably just past the front edge of dispensing lip portion 126, for the next application.

In view of the above, self-adhesive item dispenser 10 of the present invention provides a user not only with a convenient dispenser but also with an applicator and a compact self-adhesive stamp storage device all in one unit.

IV. Self-Adhesive Item Dispenser—Alternative Embodiments

FIGS. 14 and 15 depict an alternative embodiment of self-adhesive item dispenser 10 of the present invention. In this embodiment, a rolling pin 170 replaces ribs 52 and is supported by cross-bar 44. Release liner 160 fed into gap 54, then between over-molded roller 16 and rolling pin 170, and out gap 45 whereby release liner 160 is directed downward and outward by tines 42. While operating similarly to the earlier-described embodiment, the present embodiment utilizes a separate and distinct additional component, i.e., rolling pin 170, that adds cost and complexity to dispenser 10.

Figure 17:
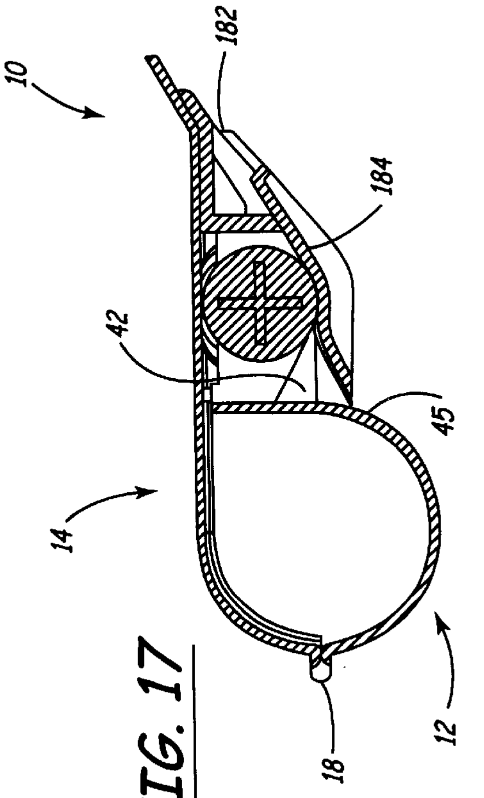
FIG. 17 is a cross-sectional view of the self-adhesive item dispenser embodiment of FIG. 16.
Figure 16:
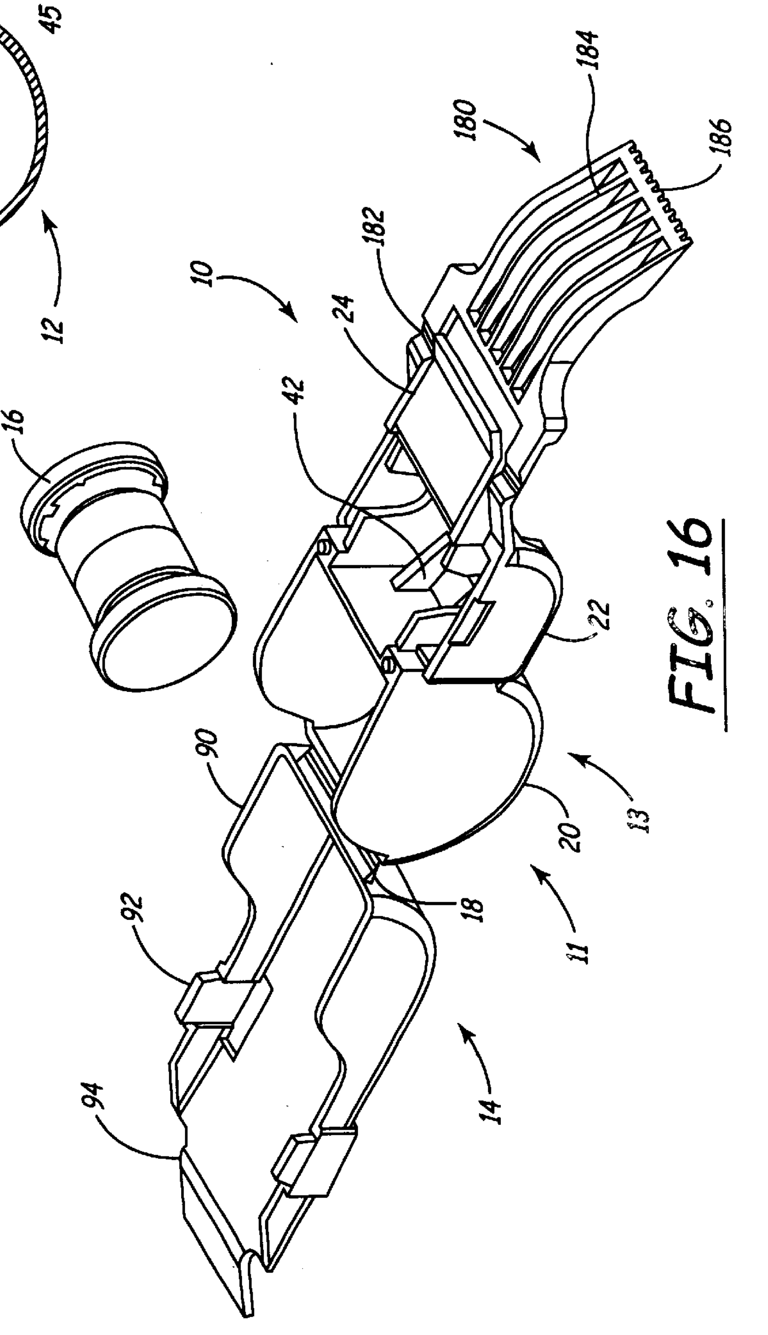
FIG. 16 provides a perspective assembly view of an alternative embodiment of the self-adhesive item dispenser of the present invention wherein the dispenser incorporates a base portion, an upper lid portion, a lower lid portion, and a roller.
Figure 18:
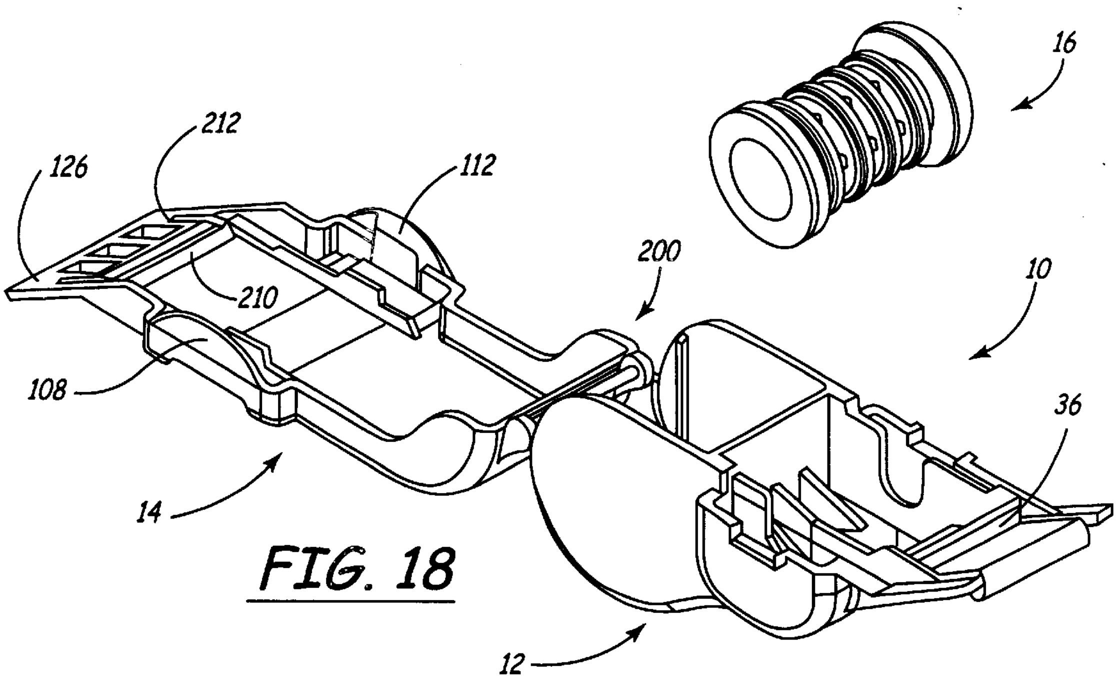
FIG. 18 provides a perspective assembly view of an alternative embodiment of the self-adhesive item dispenser of the present invention wherein the dispenser incorporates a base portion that is connectable to a lid portion via a mechanical hinge and a roller.
Figure 19:
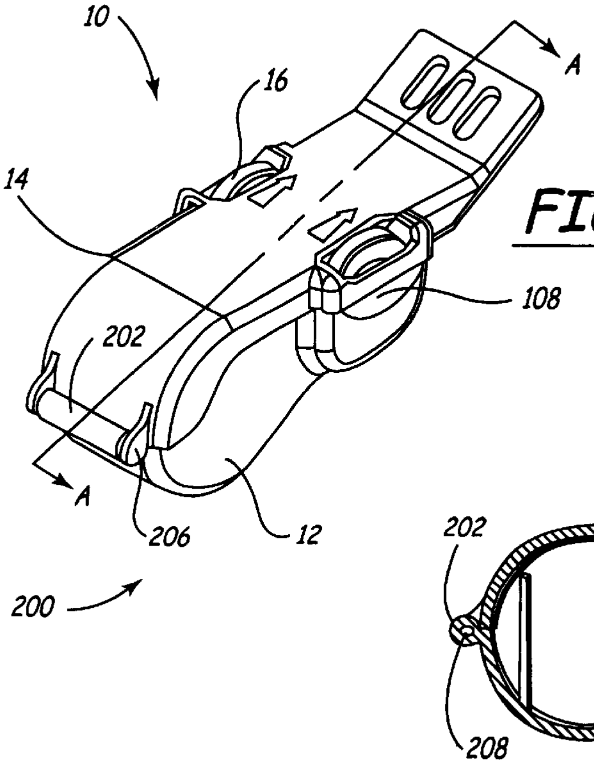
FIG. 19 provides a perspective view of the assembled self-adhesive item dispenser of FIG. 18.
Figure 20:
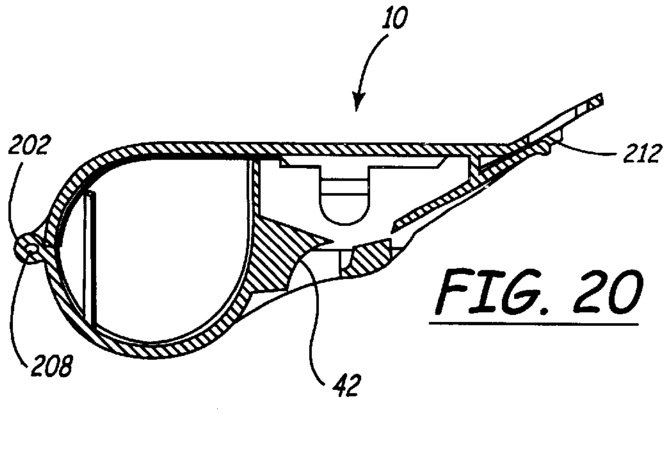
FIG. 20 provides a cross-sectional view of the self-adhesive item dispenser taken along line A—A of FIG. 19.
Figure 21:
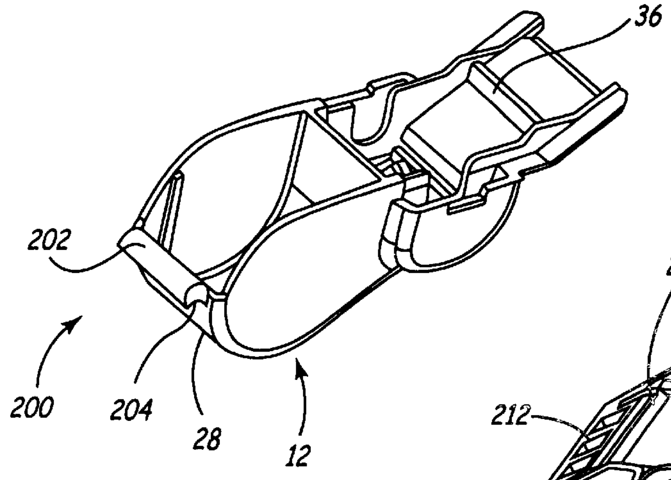
FIG. 21 provides a perspective view of the base portion of the self-adhesive item dispenser of FIG. 18.
Figure 22:
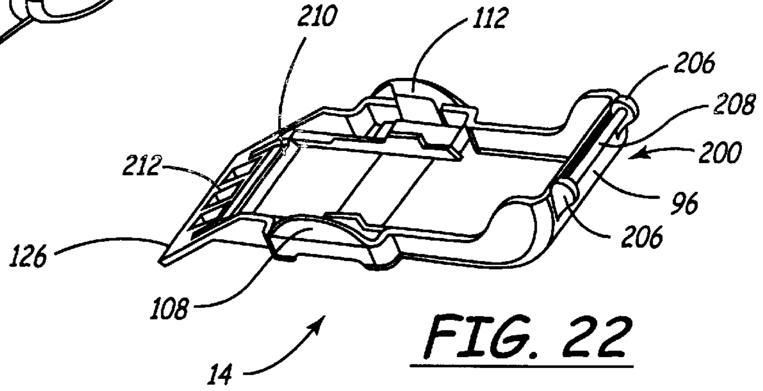
FIG. 22 provides a perspective view of the lid portion of the self-adhesive item dispenser of FIG. 18.

FIGS. 16 and 17 depict yet another alternative embodiment of self-adhesive item dispenser 10 of the present invention. In this embodiment, cross-bar 44 and its ribs 52 are replaced by a lower lid portion 180 that is connected to base portion 12 via another living hinge 182. Lower lid portion 180 incorporates a plurality of arcuately-shaped ribs 184 such that when lower lid portion 180 is closed against base portion 12 and over-molded roller 16, ribs 184 operate to press release liner 160 against roller 16. Lower lid portion 180 is provided with a serrated lip edge 186 for tearing of excess release liner 160.

In assembling dispenser 10 of FIGS. 16 and 17, release liner 160 is pulled back against the bottom of over-molded roller 16 prior to the closing of lower lid portion 180 to base portion 12. Tines 42 then direct release liner 160 out gap 45 that is created between serrated lip edge 186 of lower lid portion and stamp holding portion 20. While operating similarly to the earlier described embodiments, the present embodiment requires a second living hinge and, thus, an additional movable component, i.e., lower lid portion 180, adding complexity to dispenser 10.

FIGS. 18 through 22 depict still another embodiment of self-adhesive item dispenser 10 of the present invention. In this embodiment, base portion 12 and lid portion 14 are not joined by a living hinge but rather are maintained as distinct components. In place of living hinge 18, a mechanical hinge 200 is provided. Mechanical hinge 200, with reference to base portion 12, is comprised of a rounded hook portion 202 extending off of lower wall 28. Each end of hook portion 202 is provided locking notch 204. Mechanical hinge 200, with reference to lid portion 14, is additionally comprised of end posts 206, which extend off the rear of central cap portion 96, and a spindle 208 that extends between end posts 206. To assemble base portion 12 to lid portion 14, spindle 208 is inserted into and pulled against hook portion 202 whereby the locking notches 204 at each end of hook portion 208 operate to maintain spindle 208 in a hinged position.

Per FIGS. 18–22, additional modifications to dispenser 10 are disclosed. First, the angle of tines 42 has been modified to allow for earlier exit of release liner 160 from base portion 12. Second, side walls 108 have been rounded and extended to overlay locking tabs 112 allowing for a softer edge against a hand that is holding dispenser 10. Third, ridge 136 has been blended to a ramp formation 210, as shown, to allow for a serpentine action between ramp formation 210 and upper wall 36 of base portion 12. The serpentine action aids the separation of a stamp 158 from release liner 160. Fourth, the underside of dispensing lip portion 126 is provided with a plurality of breaker blocks 212 that are provided at the sides of slots 132. Breaker blocks 212 help to break the stamps 158 at their perforation line allowing for easier application of the stamps.

Figure 23:
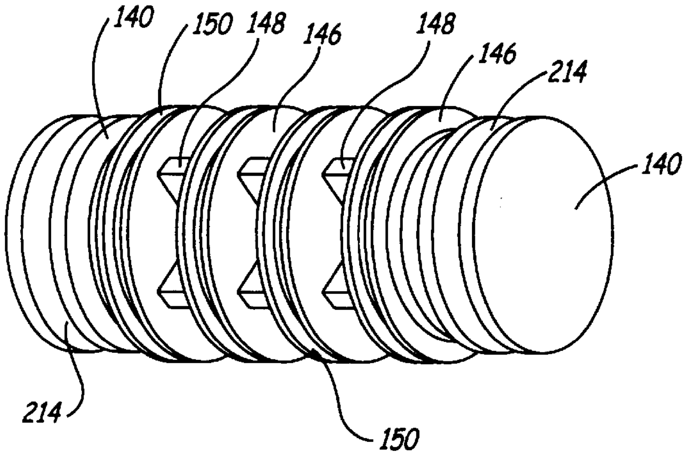
FIG. 23 provides a perspective view of the roller of FIG. 18 prior to the addition of elastomer rings.
Figure 25:
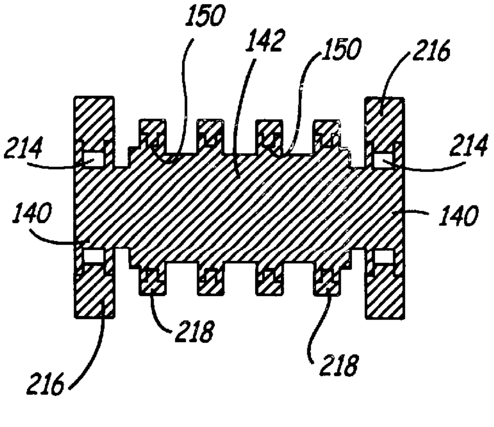
FIG. 25 provides a cross-sectional view of the roller taken along line A—A of FIG. 24.
Figure 24:
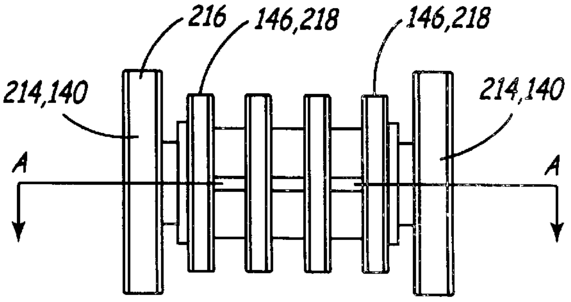
FIG. 24 provides a front view of the roller of FIG. 23 after the addition of elastomer rings.
Figure 26:
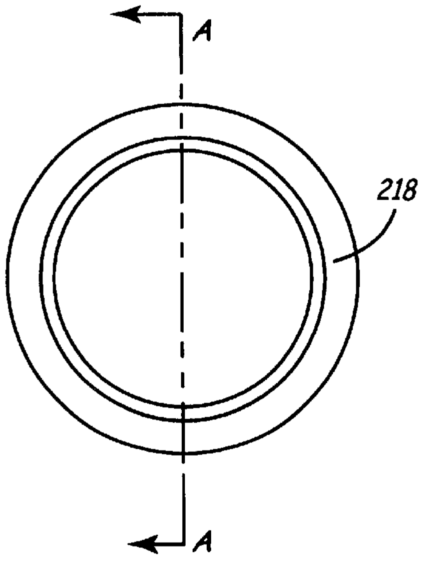
FIG. 26 provides a front view of an elastomer ring for the central rollers of the roller of FIG. 23.
Figure 27:
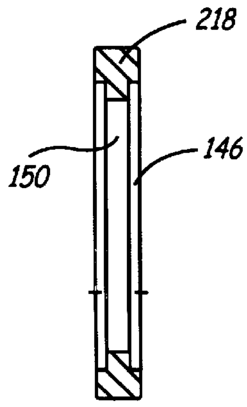
FIG. 27 provides a cross-sectional of the elastomer ring over a central roller as taken along line A—A of FIG. 26.
Figure 28:
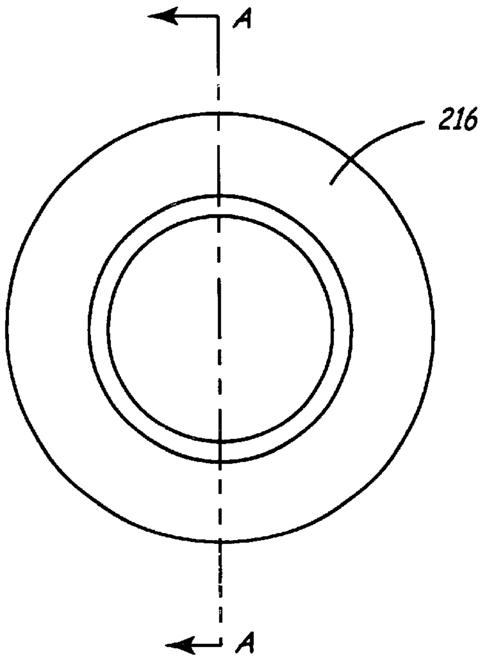
FIG. 28 provides a front view of an elastomer ring for an end wheel of the roller of FIG. 23.
Figure 29:
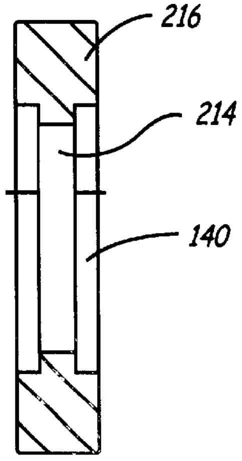
FIG. 29 provides a cross-sectional view of the elastomer ring over an end wheel as taken along line A—A of FIG. 28.

Roller 16 has also been modified per FIGS. 23–25 to eliminate the requirement of over-molding. As shown, roller 16 is defined by end wheels 140 and a central shaft portion 142. Each of end wheels 140 is provided with a central gap 214 for reception of an elastomer ring 216. Central shaft portion 142 is provided with four central rollers 146 each of which is separated from the other by a spacer 148 having a cross-hatch configuration having a lesser diameter than central rollers 146. Each of central rollers 146 incorporates a gap or notch 150 for reception of an elastomer ring 218. Notably, end wheels 140 are of a small diameter than central rollers 146 enabling placement of elastomer rings 218 on central rollers 146. The present embodiment of roller 16 may be used with any of the earlier described embodiments of base portion 12 and/or lid portion 14.

FIGS. 26–29 show the configuration of elastomer rings 216 and 218. Specifically, elastomer rings 216 and 218 having a T-shaped cross-section wherein the T-portion is insertable within gap 214 and gap 150, respectively. Elastomer rings 216 and 218 provide roller 16 with a tacky surface for hand propulsion of roller 16 and for the propulsion of release liner 160 within dispenser 10.

The embodiment of FIGS. 18–29 operates similarly to the earlier described embodiments with the added advantages described immediately above. As such, while each of the described embodiments of dispenser 10 provides unique features, the embodiment of FIGS. 18–29 is the preferred embodiment. It should be noted that the embodiment of FIGS. 18–29 is preferably manufactured with ABS plastic through the use of four molds, i.e., base portion 12, lid portion 14, roller 16 and elastomer rings 216, 218. Other plastics and mold configurations may be used without departing from the spirit or scope of the invention.

Figure 30:
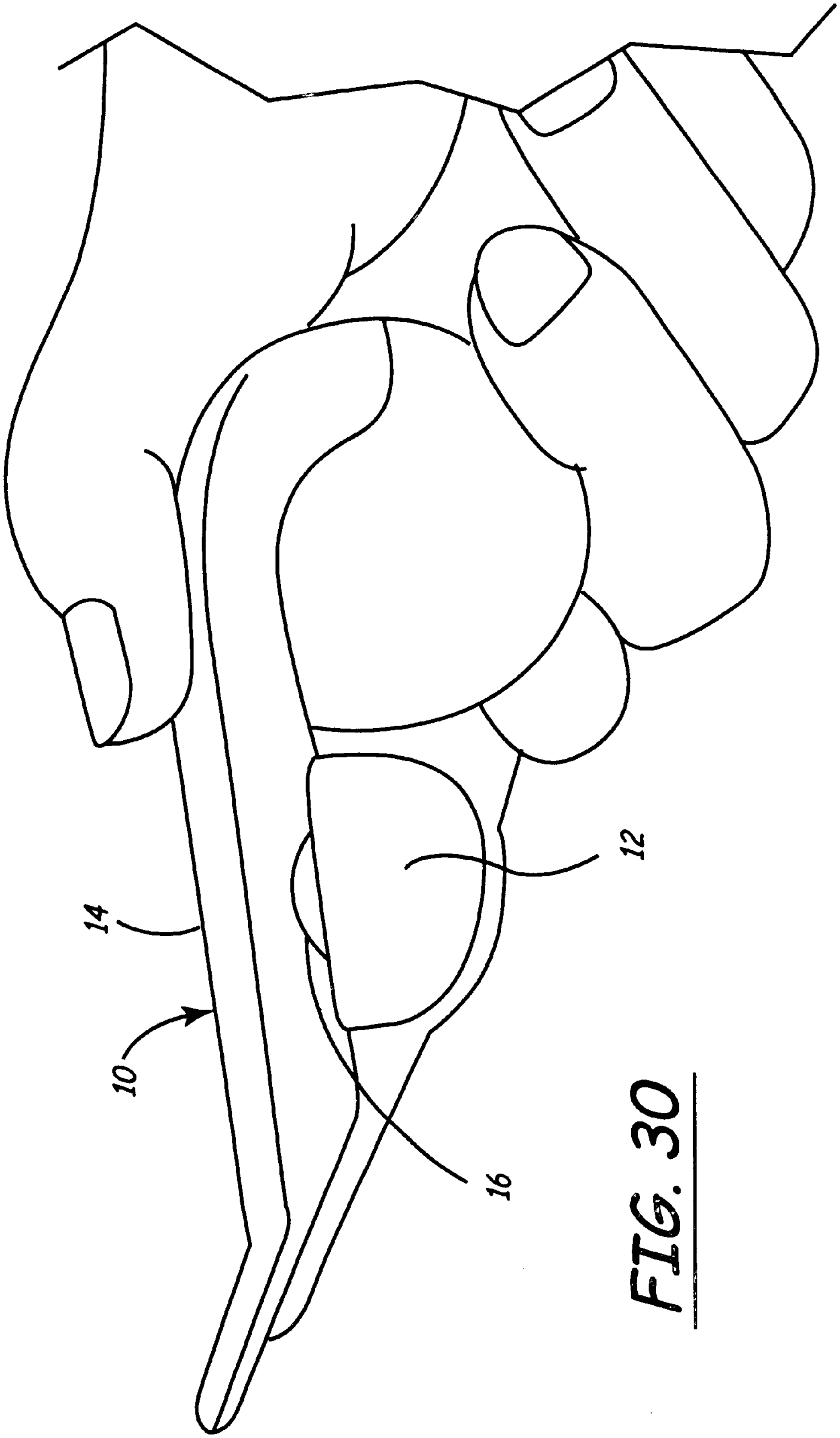
FIG. 30 provides a first manner of holding the dispenser of the present invention wherein the base portion is supported on the underside by the fingers and the thumb is used to propel the roller.
Figure 31:
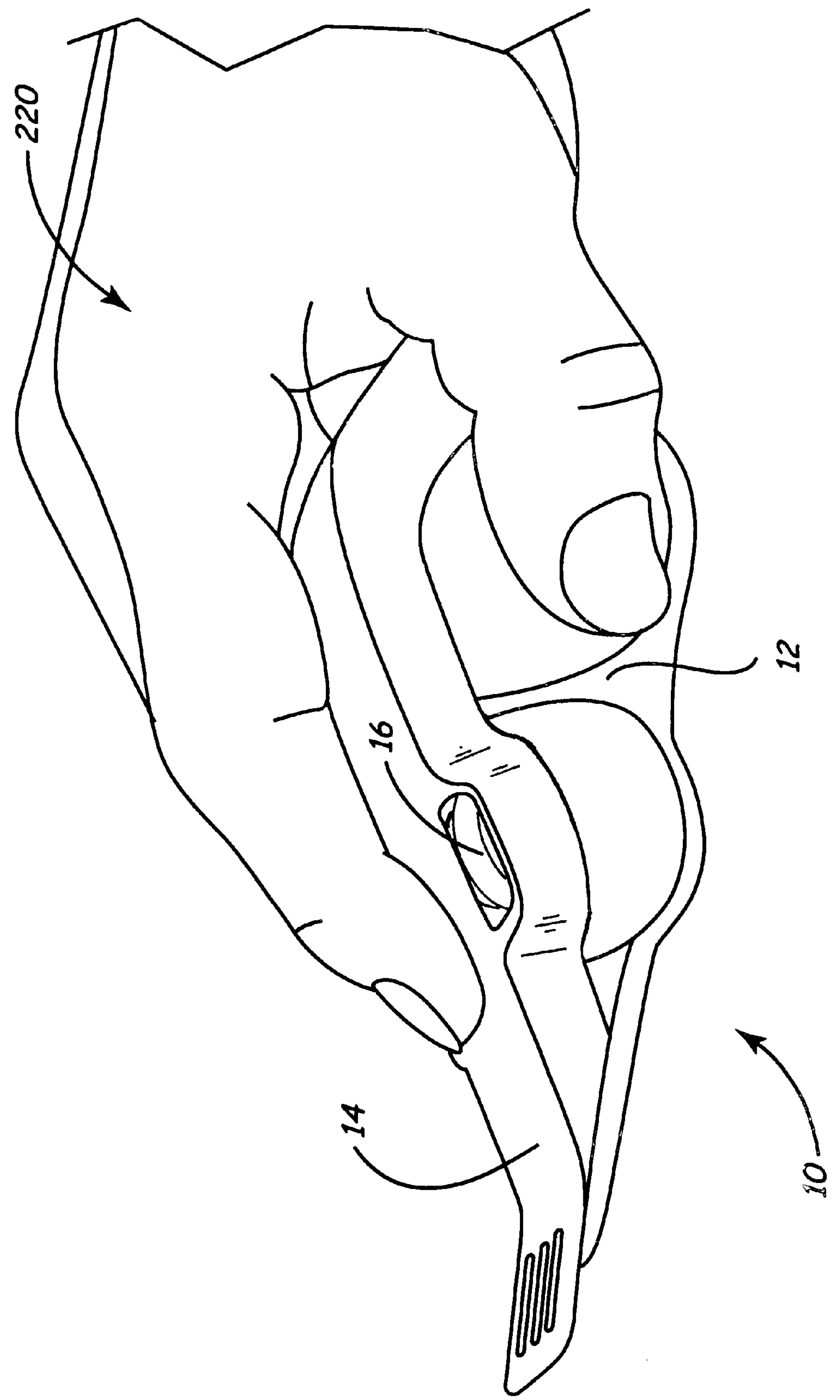
FIG. 31 provides a second manner of holding the dispenser of the present invention wherein the base portion is gripped on both sides by the thumb and fingers, the index finger remaining atop the dispenser for propelling the roller.

Referring to FIGS. 30 and 31, dispenser 10 is shown held within a human hand 220. FIG. 30 provides a first manner of holding dispenser 10 wherein base portion 12 is supported on the underside by the fingers and the thumb rests atop lid portion 14 and is used to propel roller 16. FIG. 31 provides a second manner of holding dispenser 10 wherein base portion 12 is gripped on both sides by the thumb and fingers, the index finger remaining atop lid portion 14 for propelling roller 16.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

What is claimed is:

1. A self-adhesive item dispenser for dispensing a roll of self-adhesive items that are supported by a release liner, comprising:

a base portion, wherein said base portion includes a pair of side-by-side wells having substantially parallel and coplanar latitudinal central axes, wherein a first one of the side-by-side wells has a radius sized to accommodate said roll of self-adhesive items;

a roller, wherein said roller is positionable in a second one of the side-by-side wells of said base portion and wherein said second one of said side-by side wells has a radius sized to accommodate said roller; and a lid portion, wherein said lid portion is releasably closeable over said base a portion, wherein upon closing said lid portion over said base portion, at least part of said roller extends out said lid portion to permit manual propulsion of said roller.

2. The dispenser of claim 1, wherein said roller has a central shaft portion and wherein said central shaft portion operates only in conjunction with said base portion to pull said release liner with said tacky surface.

3. The dispenser of claim 2, wherein the pulling of said release liner also operates to expel said release liner from said base portion.

4. The dispenser of claim 1, wherein said lid portion and said base portion are provided with a resistance feature.

5. The dispenser of claim 1, wherein said lid portion is unitary with said base portion and is connected to said base portion by a hinge selected from a group consisting of: a living hinge and a mechanical hinge.

6. The dispenser of claim 1, wherein said base portion includes a feature for centering said self-adhesive items within said dispenser.

7. The dispenser of claim 1, wherein said lid portion includes a feature for centering said self-adhesive items within said dispenser.

8. A self-adhesive item dispenser for dispensing a roll of self-adhesive items that are supported by a release liner, comprising:

a base portion, wherein said base portion includes a stamp cavity and a roller cavity, wherein said stamp cavity stores said roll of self-adhesive items and wherein said roller cavity is provided with a plurality of ribs;

a roller, wherein said roller is positionable within said roller cavity and interfaces with said plurality of ribs to pull said release liner and expel said release liner through said base portion; and a lid portion, wherein said lid portion is releasably closeable over said base portion.

9. The dispenser of claim 8, wherein said roller has a tacky surface.

10. The dispenser of claim 8, wherein upon closing said lid portion over said base portion, at least a part of said roller extends out said lid portion for manual propulsion of said roller.

11. The dispenser of claim 8, wherein said base portion and said lid portion are provided with a resistance feature.

12. The dispenser of claim 11, wherein said resistance feature helps to separate said self-adhesive items upon dispensing of said self-adhesive items by said dispenser.

13. The dispenser of claim 8, wherein said lid portion is unitary with said base portion and wherein said lid portion is connected to said base portion by a hinge selected from a group consisting of: a living hinge and a mechanical hinge.

14. The dispenser of claim 8, wherein said base portion includes a centering feature, and wherein said centering feature centers said self-adhesive items within said dispenser.

15. The dispenser of claim 8, wherein said lid portion includes a centering feature, and wherein said centering feature centers said self-adhesive items within said dispenser.

16. A self-adhesive item dispenser for dispensing a roll of self-adhesive items that are supported by a release liner, comprising:

base means for supporting said roll of self-adhesive items and for providing a ribbed engagement means for aiding in the separation of the self-adhesive items from said release liner;

rolling means for interfacing with said ribbed engagement means to pull said release liner and expel said release liner through said base means; and lid means for closing said base means and for presenting at least a portion of said rolling means to permit manual propulsion of said rolling means.

17. The dispenser of claim 16, wherein said base means and said lid means are provided with a resistance means for aiding in the separation of said self-adhesive items.

18. The dispenser of claim 16, wherein said base means and said lid means are unitary, and wherein said base means and said lid means are connected by a hinge selected from a group consisting of: a living hinge and a mechanical hinge.

19. The dispenser of claim 16, wherein said base means includes a centering means for centering said self-adhesive items.

20. The dispenser of claim 16, wherein said lid means includes a centering means for centering said self-adhesive item.

* * * * *